(12) United States Patent
Klurfeld et al.

(10) Patent No.: US 10,119,597 B2
(45) Date of Patent: Nov. 6, 2018

(54) TRANSMISSION ASSEMBLY

(71) Applicant: Ford Global Technologies, LLC, Dearborn, MI (US)

(72) Inventors: Steven Isaac Klurfeld, Detroit, MI (US); Gregory Daniel Goleski, Rochester Hills, MI (US); Jeffrey Edward Maurer, Commerce, MI (US); David Allen Janson, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 197 days.

(21) Appl. No.: 15/224,724

(22) Filed: Aug. 1, 2016

(65) Prior Publication Data

US 2018/0031084 A1    Feb. 1, 2018

(51) Int. Cl.
| | |
|---|---|
| *F16H 57/021* | (2012.01) |
| *F16H 3/66* | (2006.01) |
| *F16H 3/44* | (2006.01) |
| *F16H 57/08* | (2006.01) |

(52) U.S. Cl.
CPC ............ *F16H 3/666* (2013.01); *F16H 3/66* (2013.01); *F16H 3/663* (2013.01); *F16H 57/021* (2013.01); *F16H 2003/445* (2013.01); *F16H 2057/087* (2013.01); *F16H 2200/0065* (2013.01); *F16H 2200/201* (2013.01); *F16H 2200/2046* (2013.01); *F16H 2200/2048* (2013.01)

(58) Field of Classification Search
None
See application file for complete search history.

(56) References Cited

U.S. PATENT DOCUMENTS

| | | | | |
|---|---|---|---|---|
| 3,678,783 | A * | 7/1972 | O'Malley | F16H 3/66 475/276 |
| 7,470,208 | B2 | 12/2008 | Tiesler et al. | |
| 2007/0105685 | A1 * | 5/2007 | Fukuyama | F16H 3/663 475/276 |
| 2013/0225358 | A1 | 8/2013 | Singh | |
| 2014/0106924 | A1 | 4/2014 | Kienzle et al. | |
| 2014/0213408 | A1 * | 7/2014 | Shibamura | F16H 3/66 475/275 |
| 2014/0287867 | A1 * | 9/2014 | Shibamura | F16H 3/66 475/269 |
| 2014/0318921 | A1 | 10/2014 | Tsubono et al. | |
| 2014/0364270 | A1 * | 12/2014 | Vernon | F16H 3/62 475/284 |
| 2016/0265629 | A1 * | 9/2016 | Nakajima | F16H 3/663 |
| 2016/0356378 | A1 * | 12/2016 | Drosback | F16H 61/2807 |
| 2017/0268603 | A1 * | 9/2017 | Ji | F16H 3/66 |

* cited by examiner

*Primary Examiner* — Justin Holmes
(74) *Attorney, Agent, or Firm* — James Dottavio; Brooks Kushman P.C.

(57) ABSTRACT

The output gear of a transmission is externally supported from an interior support by two ball bearings. The output gear is fixed to a shell. A carrier of a simple planetary gear set and a ring gear of a stepped pinion planetary gear set are splined to the shell. A brake includes a piston supported by the bell housing and clutch plates splined to the interior support.

18 Claims, 3 Drawing Sheets

TRANSMISSION ASSEMBLY

TECHNICAL FIELD

This disclosure relates to the field of automatic transmissions for motor vehicles. More particularly, the disclosure pertains to a transmission having an output supported by external ball bearings.

BACKGROUND

Many vehicles are used over a wide range of vehicle speeds, including both forward and reverse movement. Some types of engines, however, are capable of operating efficiently only within a narrow range of speeds. Consequently, transmissions capable of efficiently transmitting power at a variety of speed ratios are frequently employed. When the vehicle is at low speed, the transmission is usually operated at a high speed ratio such that it multiplies the engine torque for improved acceleration. At high vehicle speed, operating the transmission at a low speed ratio permits an engine speed associated with quiet, fuel efficient cruising.

Typically, a transmission has a housing mounted to the vehicle structure, an input shaft driven by an engine crankshaft, and an output shaft driving the vehicle wheels, often via a differential assembly which permits the left and right wheel to rotate at slightly different speeds as the vehicle turns. Transmissions also may include a start device, such as a torque converter or start clutch, which is capable of transmitting torque from the engine to the input shaft when the input shaft is not rotating. A number of gearing elements, such as planetary gear sets, are interconnected with the input shaft, output shaft, and housing by a number of shift elements such as brakes and clutches. Various transmission speed ratios are established by selectively engaging various subsets of the shift elements.

In typical front wheel drive vehicles, the transmission and differential are combined into a unit called a transaxle. It is common for the gearing elements that establish the various ratios to drive an output gear that rotates about the input shaft and is physically located between the gearing elements and the start device. Conventionally, the output gear is supported via internal bearings by a bell housing that separates the gearing elements from the start device. Torque and power is transmitted from the output gear to the differential via transfer gears that rotate about a transfer axis. The vehicle engine compartment, which must contain both the engine and the transaxle, has a limited width. Therefore, it is desirable to minimize the length of the transaxle. Also, it is desirable to be able to locate the differential as close as possible to the center of the vehicle.

SUMMARY OF THE DISCLOSURE

In a first embodiment, a transmission includes a transmission case, an interior support fixed to the transmission case, a shell, and a plurality of clutch plates. The shell is fixed to an output gear and is externally supported from the interior support by two ball bearings. The plurality of clutch plates, which include a pressure plate, a reaction plate, and may include additional separator plates, are splined to the interior support. The transmission may also include a first simple planetary gear set having a carrier fixed to the shell. The clutch plates may be part of a brake including a clutch hub fixed to the sun gear of the first simple planetary gear set and a plurality of friction plates splined to the clutch hub and interspersed with the clutch plates. The transmission may further include a second simple planetary gear set having a sun gear fixedly coupled to an input shaft and a carrier fixedly coupled to the ring gear of the first planetary gear set. The transmission may further include a stepped pinion planetary gear set having a carrier fixedly coupled to the ring gear of the second planetary gear set.

In another embodiment, a transmission includes a transmission case, an interior support fixed to the transmission case, a shell, and a first simple planetary gear set. The shell is fixed to an output gear and is externally supported from the interior support by two ball bearings. A carrier of the first simple planetary gear set is splined to the shell. The transmission may further include a second simple planetary gear set having a sun gear fixedly coupled to an input shaft and a carrier fixedly coupled to the ring gear of the first planetary gear set. The transmission may further include a stepped pinion planetary gear set having a carrier fixedly coupled to the ring gear of the second planetary gear set. A bell housing may be fixed to the transmission case. The transmission may include a brake having a piston supported in the bell housing. The friction plates of the brake may be splined to a clutch hub which is fixedly coupled to the sun gear of the first planetary gear set. The brake may also include a plurality of separator plates splined to the interior support and interspersed with the friction plates.

In another embodiment, a transmission includes a transmission case, an interior support fixed to the transmission case, a shell, and a stepped pinion planetary gear set. The shell is fixed to an output gear and is externally supported from the interior support by two ball bearings. A ring gear of the stepped pinion planetary gear set is splined to the shell. The transmission may also include a first simple planetary gear set having a sun gear fixedly coupled to an input shaft and a ring gear fixedly coupled to the carrier of the stepped pinion planetary gear set. The transmission may also include a second simple planetary gear set having ring gear splined to the carrier of the first simple planetary gear set and a carrier splined to the shell. A bell housing may be fixed to the transmission case. The transmission may include a brake having a piston supported in the bell housing. The friction plates of the brake may be splined to a clutch hub which is fixedly coupled to the sun gear of the second simple planetary gear set. The brake may also include a plurality of separator plates splined to the interior support and interspersed with the friction plates.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A gearing arrangement is a collection of rotating elements and shift elements configured to impose specified speed relationships among the rotatable elements. Some speed relationships, called fixed speed relationships, are imposed regardless of the state of any shift elements. Other speed relationships, called selective speed relationships, are imposed only when particular shift elements are fully engaged. A discrete ratio transmission has a gearing arrangement that selectively imposes a variety of speed ratios between an input shaft and an output shaft.

A group of rotatable elements are fixedly coupled to one another if they are constrained to have the same rotational speed about the same axis in all operating conditions. Rotatable elements can be fixedly coupled by, for example, spline connections, welding, press fitting, or machining from a common solid. Slight variations in rotational displacement between fixedly coupled elements can occur such as displacement due to lash or shaft compliance. In contrast, two or more rotatable elements are selectively coupled by a shift element when the shift element constrains them to have the same rotational speed about the same axis whenever it is fully engaged and they are free to have distinct speeds in at least some other operating condition. A shift element that holds a rotatable element against rotation by selectively connecting it to the housing is called a brake. A shift element that selectively couples two or more rotatable elements to one another is called a clutch. Shift elements may be actively controlled devices such as hydraulically or electrically actuated clutches or brakes or may be passive devices such as one way clutches or brakes.

Figure 1:
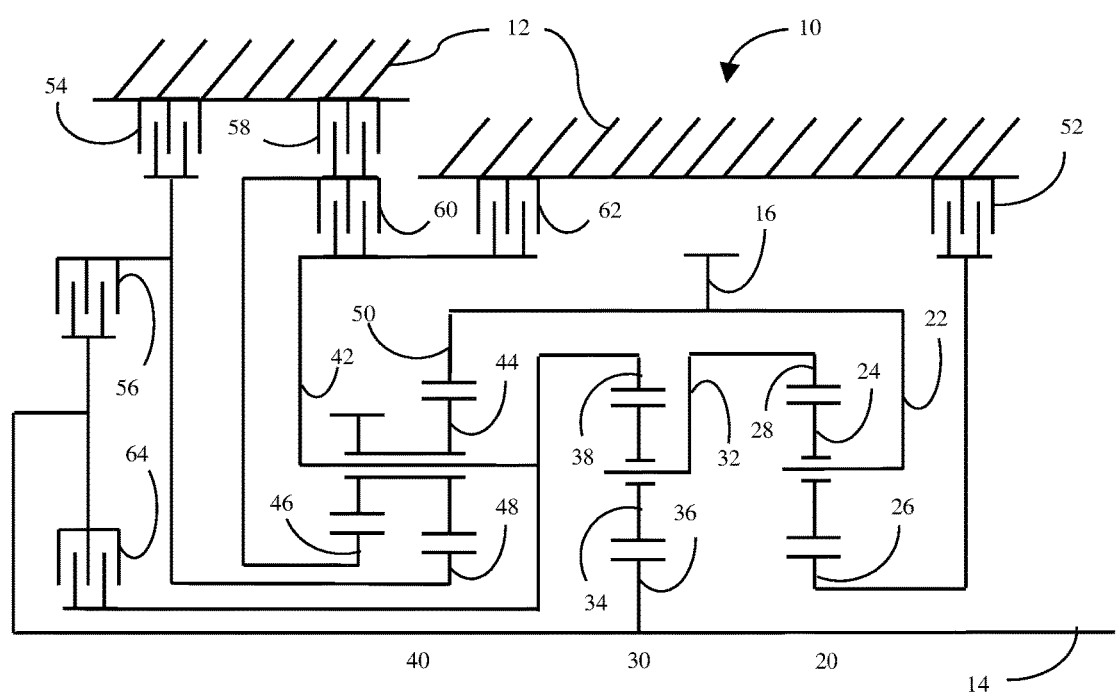
FIG. 1 is a schematic diagram of a transmission gearing arrangement.

An example transmission 10 is schematically illustrated in FIG. 1. The transmission components are supported within a transmission case 12. An input shaft 14 and an output gear 16 are supported for rotation about a central axis. Input shaft 14 is configured to be driven by an internal combustion engine, preferably via a launch device such as a torque converter. Output gear 16 drives left and right axles via final drive gearing and a differential.

The transmission utilizes two simple planetary gear sets 20, 30 and a stepped pinion gear set 40. A planet carrier 22 rotates about the central axis and supports a set of planet gears 24 such that the planet gears rotate with respect to the planet carrier. External gear teeth on the planet gears mesh with external gear teeth on a sun gear 26 and with internal gear teeth on a ring gear 28. The sun gear and ring gear are supported to rotate about the central axis. Gear set 30 is similarly structured. The planet gears 44 of stepped pinion gear set 40 have two different sets of external gear teeth with different pitch diameters. The smaller pitch diameter gear teeth mesh with sun gear 46. The larger pitch diameter gear teeth mesh with sun gear 48 and ring gear 50.

Sun gear 36 is fixedly coupled to input shaft 14. Carrier 32 is fixedly coupled to ring gear 28. Carrier 42 is fixedly coupled to ring gear 38. Ring gear 50, output gear 16, and carrier 22 are mutually fixedly coupled. Sun gear 26 is selectively held against rotation by brake 52. Sun gear 48 is selectively held against rotation by brake 54 and selectively coupled to input shaft 14 by clutch 56. Sun gear 46 is selectively held against rotation by brake 58 and selectively coupled to carrier 42 by clutch 60. Carrier 42 is selectively held against rotation by brake 62 and selectively coupled to input shaft 14 by clutch 64.

As shown in Table 1, engaging the clutches and brakes in combinations of two establishes nine forward speed ratios and one reverse speed ratio between input shaft 14 and output gear 16. An X indicates that the clutch is required to establish the speed ratio.

TABLE 1

|     | 52 | 54 | 56 | 58 | 60 | 62 | 64 |
| --- | --- | --- | --- | --- | --- | --- | --- |
| Rev |    |    | X  |    |    | X  |    |
| $1^{st}$ | X |    |    |    |    | X  |    |
| $2^{nd}$ | X |    |    | X  |    |    |    |
| $3^{rd}$ | X | X  |    |    |    |    |    |
| $4^{th}$ | X |    |    | X  |    |    |    |
| $5^{th}$ | X |    |    |    | X  |    |    |
| $6^{th}$ | X |    |    |    |    |    | X |
| $7^{th}$ |    |    |    | X  |    |    | X |
| $8^{th}$ |    | X  |    |    |    |    | X |
| $9^{th}$ |    |    |    |    | X  |    | X |

Figure 2:
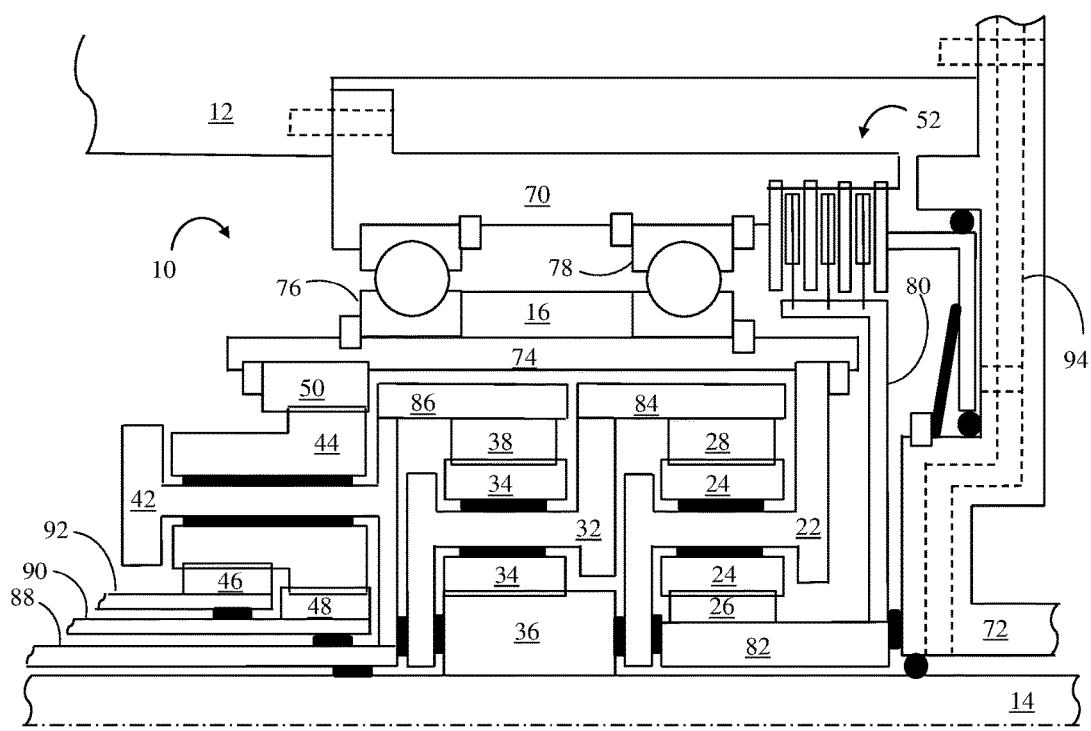
FIG. 2 is a first partial cross sectional view of a transmission having the gearing arrangement of FIG. 1.

FIG. 2 illustrates the structure of a transmission according to FIG. 1 in more detail. Interior support 70 and bell housing 72 are each bolted to transmission case 12. Shell 74 is splined to ring gear 50, output gear 16, and carrier 22 to fixedly couple these rotatable elements. Shell 74 is externally supported by ball bearings 76 and 78. Each of the ball bearings 76 and 78 includes an inner race that is fixed to shell 74 and an outer race that is fixed to interior support 70. The pressure plate, separator plates, and reaction plate of brake 52 are splined to interior support 70. The piston of brake 52 is supported by bell housing 72. The friction plates of brake 52 are spline to clutch hub 80. Clutch hub 80 and sun gear 26 are both splined to hollow shaft 82 which fixedly couples them. Carrier 32 and ring gear 28 are fixedly coupled via shell 84. Carrier 42 and ring gear 38 are fixedly coupled via shell 86. Carrier 42 is connected to clutch 64 (not shown) by hollow shaft 88. Sun gear 48 is connected to brake 54 (not shown) and clutch 56 (not shown) by hollow shaft 90. Sun gear 46 is connected to brake 58 (not shown) and clutch 60 (not shown) by hollow shaft 92. Some components which are described herein as being splined to one another may alternatively be formed from common stock or joined by other means.

Bell housing 72 defines a number of channels 94 which convey hydraulic fluid between a valve body and various components. One such channel provides pressurized fluid to the apply chamber of brake 52 to engage brake 52. A pump may be supported on the input side of the bell housing (to the right in FIG. 2). Channels in bell housing 72 may conduct fluid from a transmission sump to the pump and from the pump to the valve body. Other channels may provide fluid to the torque converter, receive return flow from the torque converter, provide fluid to engage a torque converter lock-up clutch, provide fluid to engage other clutches, or provide lubrication fluid to rotating components.

Figure 3:
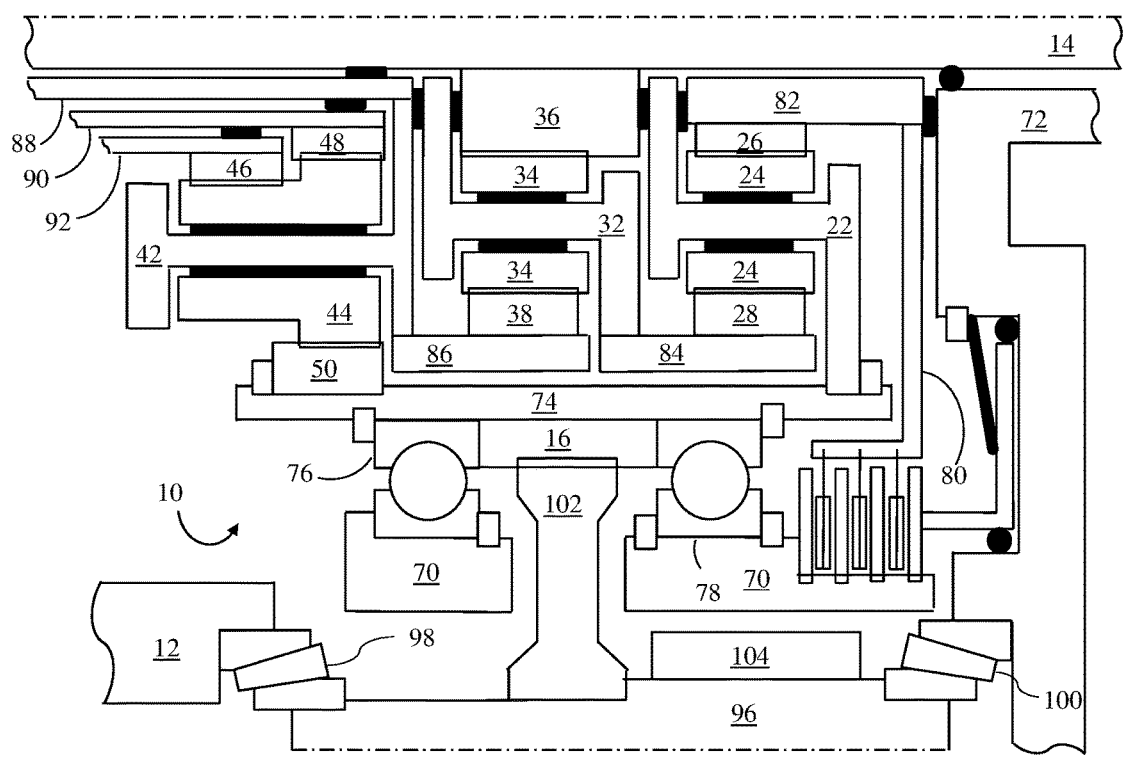
FIG. 3 is a second partial cross sectional view of a transmission having the gearing arrangement of FIG. 1.

FIG. 3 is a partial cross section through the transmission of FIG. 1 at a different radial position. Transfer shaft 96 is supported by transmission case 12 and bell housing 72 via two tapered roller bearings 98 and 100, respectively. Transfer gears 102 and 104 are fixed to transfer shaft 96. At this radial position, interior support 70 defines a gap through which transfer gear 102 extends to mesh with output gear 16.

Transfer gear 104 is located toward the bell housing relative to transfer gear 102. A park gear may also be fixed to transfer shaft 96.

The arrangement of FIGS. 2 and 3 provides several advantages relative to a more conventional arrangement. First, locating the output shaft radially outside of gear sets 20 and 30, as opposed to axially between the launch device and gear set 20, reduces the axial length of the gearbox. This makes it feasible to package the gearbox inside smaller engine compartments, or to use the transmission with longer engines in a given engine compartment. Second, this location for output gear 16 permits locating transfer gear 104 closer to the center of the engine compartment. Consequently, the differential may be located closer to the center of the vehicle allowing the left and right half-shafts to be closer to equal length. Third, interior support 70 provides a full 360 degrees of support for the pressure plate, separator plates, and reaction plate of clutch 52.

The transmission assembly illustrated in FIGS. 2 and 3 may be assembled by installing components into transmission case 12 from both ends. Several groupings of parts may be assembled into sub-assemblies before insertion into the transmission case. For example, bearing 76 may be fastened to internal support 70 with a snap ring. Bearing 78 may be fastened to shell 74 and axially held between a snap ring and output gear 16 which is either splined to shell 74 or integrally formed into shell 74. Then, shell 74 and bearing 76 may be assembled to interior support 70 and bearing 78 and held together with two snap rings. Then, this sub-assembly is inserted into transmission case 12 and fastened by bolts. Then, the clutch pack for brake 52 is inserted into interior support 70. Alternatively, the clutch pack may be splined to interior support 70 before installation in the case. Then, clutch hub 80, hollow shaft 82, and sun gear 26 are fastened to one another and inserted from the right. The piston and return spring of brake 52 are assembled to bell housing 72. Transfer shaft 96, along with gears 102 and 104 and bearings 98 and 100, is installed before bolting bell housing 72 to transmission case 12. The remaining planetary gearing elements and shift elements are inserted from the left. Some combinations of these elements may be pre-assembled to one another before insertion into transmission case 12.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A transmission comprising:
a transmission case;
an interior support fixed to the transmission case;
a shell fixed to an output gear and externally supported from the interior support by two ball bearings; and
a plurality of clutch plates splined to the interior support.

2. The transmission of claim 1 further comprising:
a first sun gear;
a first carrier fixed to the shell;
a first ring gear; and
a first plurality of planet gears each supported for rotation with respect to the first carrier and meshing with both the first sun gear and the first ring gear.

3. The transmission of claim 2 further comprising:
a clutch hub fixedly coupled to the first sun gear; and
a plurality of friction plates interspersed with the plurality of clutch plates and splined to the clutch hub.

4. The transmission of claim 2 further comprising:
a second sun gear fixedly coupled to an input shaft;
a second carrier fixedly coupled to the first ring gear;
a second ring gear; and
a second plurality of planet gears each supported for rotation with respect to the second carrier and meshing with both the second sun gear and the second ring gear.

5. The transmission of claim 4 further comprising:
a third sun gear;
a fourth sun gear;
a third carrier fixedly coupled to the second ring gear;
a third ring gear fixed to the shell; and
a third plurality of planet gears each supported for rotation with respect to the third carrier and meshing with the third sun gear, the fourth sun gear, and the third ring gear.

6. The transmission of claim 5 further comprising:
a first brake configured to selectively hold the third carrier against rotation;
a second brake configured to selectively hold the third sun gear against rotation; and
a third brake configured to selectively hold the fourth sun gear against rotation.

7. The transmission of claim 6 further comprising:
a first clutch configured to selectively couple the third carrier to the input shaft; and
a second clutch configured to selectively couple the third sun gear to the input shaft.

8. The transmission of claim 7 further comprising:
a third clutch configured to selectively couple the fourth sun gear to the third carrier.

9. A transmission comprising:
a transmission case;
an interior support fixed to the transmission case;
a shell fixed to an output gear and externally supported from the interior support by two ball bearings; and
a first simple planetary gear set having a first sun gear, a first ring gear, and a first carrier splined to the shell.

10. The transmission of claim 9 further comprising a second simple planetary gear set having a second sun fixedly coupled to an input shaft, a second ring gear, and a second carrier fixedly coupled to the first ring gear.

11. The transmission of claim 10 further comprising a third planetary gear set having a third sun gear, a fourth sun gear, a third ring gear splined to the shell, and a third carrier fixedly coupled to the second ring gear.

12. The transmission of claim 9 further comprising a bell housing fixed to the transmission case.

13. The transmission of claim 12 further comprising a first brake having a hub fixedly coupled to the first sun gear, a plurality of friction plates splined to the hub, a plurality of separator plates interspersed with the friction plates and splined to the interior support, and a piston supported by the bell housing.

14. A transmission comprising:
a transmission case;
an interior support fixed to the transmission case;
a shell fixed to an output gear and externally supported from the interior support by two ball bearings; and
a stepped pinion planetary gear set having a first sun gear, a second sun gear, a first ring gear splined to the shell, and a first carrier.

15. The transmission of claim 14 further comprising a first simple planetary gear set having a third sun fixedly coupled to an input shaft, a second ring gear fixedly coupled to the first carrier, and a second carrier.

16. The transmission of claim 15 further comprising a second simple planetary gear set having a fourth sun gear, a third ring gear fixedly coupled to the second carrier, and a third carrier splined to the shell.

17. The transmission of claim 16 further comprising a bell housing fixed to the transmission case.

18. The transmission of claim 17 further comprising a brake having a hub fixedly coupled to the fourth sun gear, a plurality of friction plates splined to the hub, a plurality of separator plates interspersed with the friction plates and splined to the interior support, and a piston supported by the bell housing.

* * * * *